Dec. 25, 1928.
G. W. PICKARD
1,696,895
HIGH TENSION ELECTRICAL CONDENSER
Filed June 26, 1924
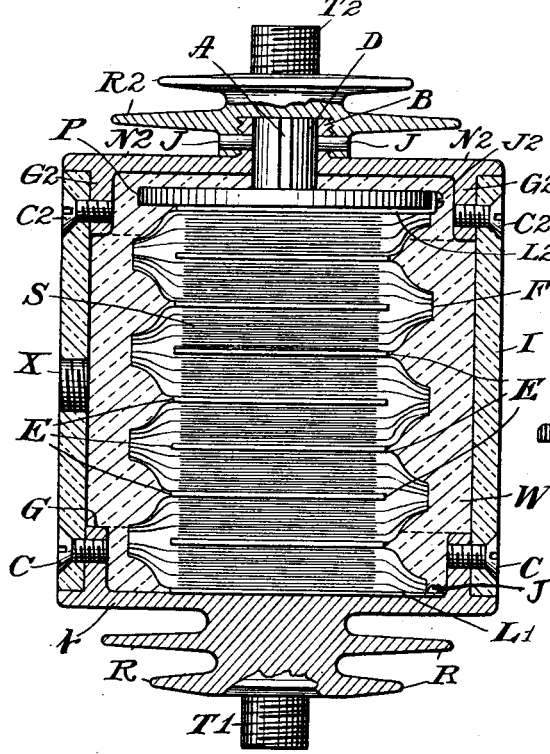
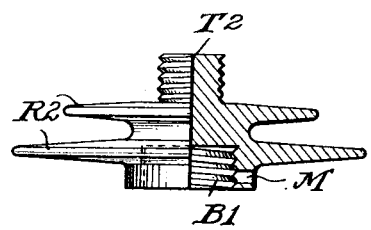
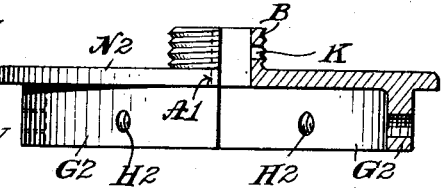
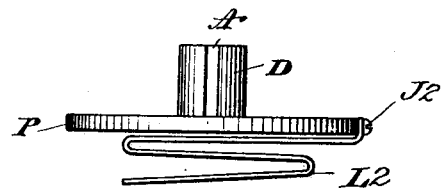
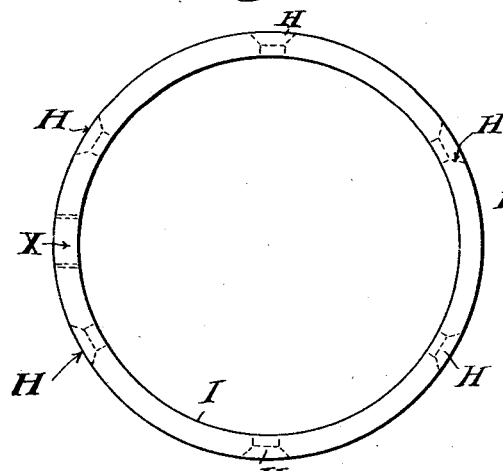
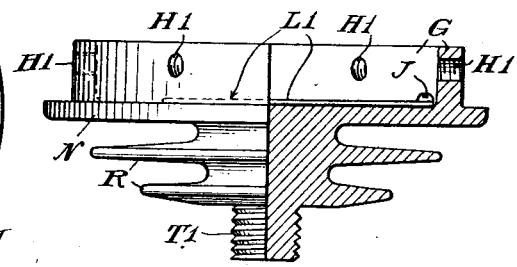
INVENTOR
GREENLEAF WHITTIER PICKARD
BY
Philip Farnsworth ATTORNEY Patented Dec. 25, 1928.

1,696,895

UNITED STATES PATENT OFFICE.

GREENLEAF WHITTIER PICKARD, OF NEWTON CENTER, MASSACHUSETTS, ASSIGNOR TO WIRELESS SPECIALTY APPARATUS COMPANY, OF BOSTON, MASSACHUSETTS, A CORPORATION OF NEW YORK.

HIGH-TENSION ELECTRICAL CONDENSER.

Application filed June 26, 1924. Serial No. 722,431.

This invention relates to improvements in high tension electrical condensers of the sheet-stack type, more particularly those wherein the stack comprises a plurality of serially-connected sections whereby the stack has a high potential difference across its ends.

An object of the invention is to provide a structure whereby the stack is clamped between metal clamping means applied to its ends, yet all parts of the stack of high potential difference are provided with better insulation than is practicable where a metal casing is employed for a stack of this type.

The invention consists of the improvements substantially as shown and described in the drawings, of which Figure 1 is an assembly shown generally in central longitudinal section but with certain parts shown in elevation;

Fig. 2 is a plan of the enclosing casing of the assembly of Fig. 1;

Figs. 3–5 are elevations of parts shown in assembly at the top of Fig. 1, Fig. 3 being an elevation of a heat-radiating terminal at one end of the stack and casing, Fig. 4 being an elevation of a metal casing end, and Fig. 5 being an adjustable clamping member;

Fig. 6 is an elevation of the metal parts of the lower end of Fig. 1.

Heretofore it has been customary, with stacks of this type consisting of serially-connected sections, to enclose the stack in a wax embedment itself enclosed in a metal casing constituting the low potential terminal or grounded side of the stack. While such casing of metal provides a practical construction, yet it involves practical difficulties in properly insulating the high potential portions of the stack, and the high potential terminal thereof, from the metal of the casing. In accordance with this invention, the metal parts and terminals at the opposite ends of the stack, which have high potential difference, are insulated from one another by an insulating casing extending from end to end of the stack and mechanically connected with the metal parts at the two ends of the stack.

The stack S itself is shown in assembly in Fig. 1 and is in the usual form of stacks of the serially-connected section type, the several sections being shown as insulated from one another by separators E, and the projecting foils F of each section being shown as connected to the projecting foils of like polarity of an adjacent section.

In Figs. 1 and 2 is shown a casing I of insulating material such as micarta, bakelite or other insulating material, this being preferably in tubular form with open ends as shown and constituting a continuous circular side wall of the casing enclosing the wax embedment W which surrounds stack S between the metal end plates of the casing. The thickness of the wall of tubular casing I and the insulating material of which the tube is composed are such as to provide sufficient strength to withstand the tensile strain to which the tube I is subjected, as will be described. Casing I may be tubular in other cross sections than circular.

The open end of tube I shown at the lower part of Fig. 1 is closed by a metal end member shown in Fig. 6, in elevation at the left half, and in section at the right half. This member and those shown in Figs. 3–5 preferably consist of cast aluminum for lightness, strength and electrical conductance. The metal bottom member of Fig. 6 comprises an end-closing and clamping plate N, and other parts cast integral therewith, as follows. The flange G is tapped with six equally spaced holes H¹ which register with holes H of insulating tube I of Fig. 2, both sets of holes receiving the screws C (Fig. 1) to secure tube I and end clamping member together, the tube fitting, as shown in Fig. 1, against flange G and the upper surface of the peripheral portion of end plate N. The end member of Fig. 6 also comprises the heat-radiating fins or vanes R and a threaded terminal T¹ for the attachment of an external lead to the condenser. As shown in Fig. 1, an internal lead L¹, which consists of a thin, flexible copper strip, compressed between the stack and the end plate N, is connected to the lowermost section of the stack at one end, as by fusing to a projecting copper foil of that section; and said strip L¹ is screwed at J in good electrical and thermal connection with end plate N to connect that end of the stack with the terminal post T¹ and vanes R. This lead L¹ is thereby electrically and thermally connected to plate N, preferably before the bottom member of Fig. 6 is screwed into place at the lower part of tube I. Stack S, resting on the bottom plate N, is assembled with tube I, and screws C pass through the registering holes in both said members N and I. The end parts of this condenser may be held to the insulating casing, i. e., secured against being forced off the end or ends of the insulating casing, in various ways other than that herein disclosed.

The other end of the stack is provided with a similar copper strip lead L², connected to the uppermost section of stack S, as by soldering to an end copper foil of that section, and screwed at J² to the clamp plate P (Figs. 1 and 5). This copper strip L² may be several inches long so that it may be connected conveniently both to the end section of stack S and to clamping plate P when said stack and plate before assembly with tube I are separated from one another; and when the connections of the ends of strip L² are made, the latter may be folded accordion-wise (Fig. 5) by the bringing together of the stack and plate P inside tube I. Preferably cast integral with plate P is a cylindrical boss D which is formed with a spline A for a $\frac{3}{8}$ inch square key, the other half of the spline being formed at A¹ in boss B and plate N² of Fig. 4. This arrangement prevents the turning of plate P when it is forced against the stack by the member of Fig. 3 to be described.

Thus far, the stack S has been assembled with the end casting of Fig. 6 and with the clamping member P of Fig. 5, all three being surrounded by the insulating tube I; tube I and the lower metal end being secured together by the six lower screws C, the wax W of Fig. 1 not yet having been emplaced. Next, the other end plate N² (Fig. 4) is put in place, (on top of clamping plate P) its upper externally threaded integral boss B being formed hollow to be slipped over the boss D of clamping plate P of Fig. 5 now resting on top of stack S. This end plate N² is secured to tubular insulating casing I by screws C², the tube I fitting against end plate N² and flange G² in the same way as at the other end of the casing.

Next, the heat-radiating terminal shown in Fig. 3, internally threaded at B¹, is screwed over boss B of casing-end N². This terminal member of Fig. 3 comprises heat-radiating fins or vanes R² and a threaded terminal post T²; the upper part of the casting being solid internally above the hollow threaded portion B¹. As this terminal member of Fig. 3 is screwed down on boss B of end plate N², the interior solid portion engages the top of boss D of clamping plate P of Fig. 5, and forces said plate against stack S, the stack bearing at its other end against bottom clamping plate N. Terminal member T² is screwed down until the mica and foil sheets of the entire stack are brought together in intimate contact with one another successively under as high pressure as practicable without deforming the foil strips of the stack. The wall of insulating tube I acts as the tension member of the clamping system. Clamping plate P has sufficient diameter to engage over the entire active area of the stack sheets, like bottom end member N. Preferably stack S previously has been subjected to wax treatment wherein molten paraffin wax has been allowed to enter between the stack-sheets, and then while molten has been squeezed out by the application of high mechanical pressure of the order of a ton per square inch, carrying with it all air or moisture and any other foreign matter harmful to the condenser in service. The application of clamping plate P in the final assembly of the condenser restores the above compressed condition of the stack and keeps out air and moisture permanently.

The clamping and terminal member T² of Fig. 3 is screwed down by a spanner-wrench engaging in the holes M (Fig. 3) shown in Fig. 1 as occupied by pins J, J. When the desired pressure on stack S has been attained, the holes M in the terminal member are continued by drilling holes K (Fig. 4) in boss B of the casing-end of Fig. 4. Finally, in registering holes M, K of Figs. 3 and 4 respectively are driven the pins J, J of Fig. 1, thereby locking the parts against rotation and maintaining permanently the desired high service pressure on the stack S.

It is contemplated to be practical to employ various forms of clamping means, in combination with the insulating stack-casing of the invention; and it is not necessary that the insulating casing be, as shown, a tension member of the stack-clamp, as shown, or any part of the clamp, although the use of the insulating casing as a tension member of the stack-clamp is a valuable feature of the invention.

As shown in Figs. 1 and 2, the insulating tube I is formed with a threaded opening X intermediate the ends of the tube, which at this stage of manufacture is the only opening from outside to the space between the sides of stack S and the casing,—the metal end members entirely enclosing the open ends of insulating tube I. Through said opening X molten paraffin wax (as one of the various suitable fillers) is flowed into such space to form the solidified embedment W around the stack. This "waxing" or embedment of the condenser is effected after the stack has been put under the desired compression, and the wax embedment serves to keep air and moisture from approaching the sides of the stack. Since the wax contracts on cooling, additional wax will be added at proper intervals through opening X, during the period when the embedment is cooling and solidifying, for the purpose of completely filling the casing with wax and preventing the formation of cracks or voids in the embedment. The wax fills the space, as shown, between top end plate $N^2$ and compression plate P. After the insulating embedment W has solidified, filling the entire space between stacks and all the walls of casing I, a screw plug, preferably of insulating material, is screwed into lateral threaded opening X (Figs. 1–2) in order completely to seal the device. This screw may be screwed into the wax embedment W until its outer face is flush with the outer surface of insulating tubular casing I.

Either external terminal $T^1$ or $T^2$ may be the high or low potential terminal of the condenser. Insulating casing I preferably is tubular for strength and simplicity of construction. In this device, between the two end sections of stack S there are no metal parts save the foils of the stack and end leads $L^1$, $L^2$; that is, the entire structure between its ends consists (with the exception of the foils and end-leads) of insulating material, including the mica or other insulating sheets of the stack, the insulating (mica) section-separators E, the wax embedment W and the insulating casing tube I. Thus there is maximum insulation between the metal parts connected with the two ends of the stack; and as the potential difference increases with the distance from a low potential end of the stack, the parts of the apparatus adjacent such higher potential portions of the stack, consisting of insulating material as they do, obviate all insulation difficulties. As the potential rises at portions of the stack yet further removed from the low potential end, such portions are located in the vicinity of the metal end parts of the condenser constituting the high potential portions of the apparatus which are insulated by casing I. The insulating casing also provides ample leakage path or creepage distance between the respective metal end portions of the device. The insulating casing I readily is made of sufficient strength to withstand the tension clamping strains, without undue thickness of the enclosing wall. With this construction, no especial attention is required to the matter of relative location of the casing wall I and sections of stack S intermediate its ends, and by reason of the casing wall consisting of insulating material, the wall may be as close as desired to projecting stack foils F, only a minimum of wax-filled space between the casing wall and the stack being desirable; that is, the wax embedment W may be thin as compared with the practice heretofore because it is employed only to seal the stack against air and moisture, and only (in combination with the insulating casing wall) for the purpose of insulating the stack from exterior metal objects. This condenser unit by reason of its construction readily can be made into units of large capacity and high voltage, and thereby is especially adapted for use in connection with carrier currents in the art of electrical communication.

The heat-radiating vanes R and $R^2$ serve to keep down the temperature of the stack during service, and act in lieu of the metal casings heretofore employed; the heat being conducted to said radiating vanes from the metal casing ends, both directly from the stack particularly by conductors $L^1$, $L^2$ and also via the wax filler W to the casing ends. The conductors $L^1$, $L^2$ take heat to N and R not only from the end faces of the stack S but also from the interior of the stack by way of the armature foils F; and the clamping of $L^1$, $L^2$ at $J^1$, $J^2$, and between the stack and the metal parts N and P, provides good thermal connections between the stack (inside of which the heat is generated) and the heat-dissipating surfaces (as R, $R^2$) outside the casing. This is important in case of use of heavy currents, because here the insulating casing portion I is not a good heat-conductor (as were the prior metal casings extending alongside projecting foils F) and therefore the only outward route here for heat absorbed from the stack and its projecting foils F by wax W is via the wax (which preferably is of small mass) to the metal end structures. Hence the leads $L^1$, $L^2$, in this combination with the insulating casing I, are relied on not only as terminal leads but as the principal means for removing heat continuously from the interior of the stack to the external heat-dissipating surfaces of the metal structures at the ends of the insulating casing. Thus as shown and described, the conductors $L^1$, $L^2$ not only are in good thermal contact with the parts which they connect, but themselves are of substantial cross-sectional area relative to the individual foil-bunches, (with all of which they are connected in series) so as to permit said continuous drain of heat to both ends of the condenser from its middle. In instances where the heat radiation is needed only at one end of the condenser, the insulating casing may be tubular or box-shape with integral bottom, and without any metal parts at the bottom, save permissively a terminal projecting from the stack through an opening in the insulating bottom and constituting the metal end structure at the bottom. In any instance wax filling may be omitted.

The advantages of this strikingly novel invention as a whole are many and various and include the following. In the practical construction provided, the ends of the stack at highest potential difference, and the parts of high potential difference along the stack between its ends, are amply insulated from one another by the insulating casing, thereby obviating all the prior difficulties in metal-cased stacks, as to insulating the high potential terminal from the metal casing, and in preventing the metal casing from too close electrical relation with the points of high potential difference along the length of the stack between its ends. The new combination accomplishes not only this result but at the same time it permits application to the stack of the important high mechanical compression in such manner that the insulating material of the casing functions satisfactorily as the tension member of the stack-clamping system notwithstanding the inherent structural weakness of all insulating material. Use of the insulating casing has demonstrated that the insulating material possesses sufficient tensile strength to withstand the very high mechanical strains involved in the compression of the stack. The insulating character of the casing permits reduction of the space between stack and casing as compared with metal-cased stacks where a thick wall of wax has been required between the stack and the metal wall of the casing. Here there is no metal alongside the stack requiring to be insulated from the stack, the insulating casing of about the length of the stack provides ample anti-creepage distance, and if wax is used at all (the comparatively thin mass shown is preferred) it is chiefly for the purpose of sealing the stack against air and moisture, so that only a few cents worth of wax is sufficient and adds little to the weight. With such small amount of wax embedment of the stack it is comparatively easy to produce an embedment which is free of holes, and with the provision of the insulating casing the matter of holes or cracks in the embedment is of comparatively little importance as contrasted with the practical necessity of an holosteric embedment in metal-cased stacks. The metal end structures permit good and equal heat radiation from both ends of the stack and either end may be employed as the high potential terminal.

The relative arrangement of condenser S, the threads B¹ (Fig. 3), and the compression member P is that said threads of the pressure-applying means are at what may be termed properly a compressing angle with the adjustable compression member P on the end of condenser S. The member N², threaded for engagement with the pressure-applying means, B¹, is forced away from the condenser S when imparting tension strains to insulating casing I when the pressure-applying threads are operated to compress condenser S, so that member N² is itself a tension member as distinguished from the adjustable compressing member P.

I particularly point and distinctly claim the part, improvement, or combination which I claim as my invention or discovery, as follows:—

1. A high tension electrical condenser comprising a sheet-stack consisting of a plurality of serially-connected stack-sections permitting high potential difference across the stack-ends; a tubular casing of insulating material extending around the sides of the stack and having end openings in the vicinity of the stack-ends; a metal end structure held to said insulating casing and closing one end thereof, one end of the stack abutting against said metal end structure; a metal end structure fixedly held to the other end of said insulating casing; a metal compression member engaging the end of the stack adjacent said second metal end member; and a metal compression-adjusting member movably engaging said second end member and bearing against said compression member, holding the stack sheets in intimate contact with one another successively; said second end member transmitting clamping tension to the tubular insulating casing; and said insulating casing providing an extended creepage distance between the condenser ends of high potential difference.

2. A high tension electrical condenser comprising a sheet-stack consisting of a plurality of serially-connected stack-sections permitting a high potential difference across the stack-ends; a tubular casing of insulating material extending around the sides of the stack and having end openings in the vicinity of the stack-ends; metal end structures held to said insulating casing and respectively closing the ends thereof, one end of the stack abutting against one of said end structures; and a stack-clamping device located inside the casing between the other end of the stack and the other of said end structures; said clamping device compressing the stack between itself and the first end structure and holding the stack-sheets in intimate contact with one another successively; said second end structure transmitting clamping tension to the tubular insulating casing; and said insulating casing providing an extended creepage distance between the condenser ends of high potential difference.

3. A high tension electrical condenser comprising a sheet-stack consisting of a plurality of serially-connected stack-sections permitting a high potential difference across the stack-ends; a tubular casing of insulating material extending around the sides of the stack and having end openings in the vicinity of the stack-ends; two metal condenser terminals held to the respective ends of the insulating casing, electrically connected to the corresponding stack-ends inside the casing and extending through and closing said openings in the insulating casing; one end of the stack abutting against one of said terminals; the second terminal including an adjustable metal member holding the stack-sheets in intimate contact with one another successively; said second terminal being secured to the insulating casing and transmitting the stack-clamping tension thereto; and said insulating casing providing an extended creepage distance between the condenser ends of high potential difference.

4. A high tension electrical condenser comprising a sheet-stack consisting of a plurality of serially-connected stack sections; a tubular casing of insulating material extending around the sides of the stack and having end openings in the vicinity of the ends of the stack; metal end structures held to said insulating casing and closing the ends thereof, one end of the stack abutting against one of said end members; and a stack-clamping device located inside the casing between the other end of the stack and the other of said end structures, said clamping device compressing the stack against the first end structure and holding the stack-sheets in intimate contact with one another; and said second end structure transmitting clamping tension to the tubular insulating casing.

5. A high tension electrical condenser comprising a sheet-stack consisting of a plurality of serially-connected stack-sections; a tubular casing of insulating material extending around the sides of the stack and having end openings in the vicinity of the stack-ends; two metal condenser terminals held to the respective ends of the casing, electrically connected to the corresponding stack-ends inside the casing, and extending through said casing-openings; one end of the stack abutting against one of said terminals; and a metal member adjustably mounted in the other terminal, holding the stack-sheets in intimate contact with one another successively, and holding said insulating tubular casing under tension via said terminal.

6. A high tension electrical condenser comprising a sheet-stack consisting of a plurality of serially-connected stack-sections; an insulating casing extending around the sides of said stack; a clamping member located inside said casing, engaging one end of the stack, and holding the stack-sheets in intimate contact with one another successively, and a metal end structure held to the casing, engaging said stack clamping member, and transmitting clamping tension to the insulating casing.

7. A high tension electrical condenser comprising a sheet-stack consisting of a plurality of serially-connected stack sections; an insulating casing extending around the sides of said stack; and a stack-clamping device located inside said insulating casing between one end of the stack and the casing, and holding the stack under compression and its sheets in intimate contact with one another successively, said stack-clamping device being mechanically connected with said insulating casing thereby putting the insulating casing under the tension stress of the stack clamping.

8. A high tension electrical condenser comprising a sheet-stack consisting of a plurality of serially-connected stack-sections; an insulating casing extending around the sides of said stack, and having an end opening adjacent an end of the stack; a metal end structure fixedly held to said casing and closing said opening; and a metal compressing member engaging said stack-end and in movable relation with said end structure, holding the stack under compression and the insulating casing under tension.

9. A high tension electrical condenser comprising a sheet-stack consisting of a plurality of serially-connected stack-sections; a casing of insulating material extending around the sides of the stack, forming an enclosed space around said stack-sides; a stack-clamping device located inside said insulating casing between one end of the stack and the casing, mechanically connected with the insulating casing thereby putting it under stack-clamping tension; and a readily fusible insulating embedment filling said enclosed space between the stack and insulating casing.

10. A high tension electrical condenser comprising a sheet-stack consisting of a plurality of serially-connected stack sections; an insulating casing extending around the sides of said stack, and having an end opening adjacent an end of the stack; a metal end structure fixedly held to the casing; a metal compression member pressing the corresponding end of the stack; and a metal compression-adjusting member movably engaging said end member and pressing said compression member against the stack and holding the stack-sheets in intimate contact with one another successively; said metal end structure held to the casing holding the latter under tension.

11. A high tension electrical condenser comprising a sheet-stack consisting of a plurality of serially-connected stack-sections; a casing of insulating material extending around the sides of the stack and having an end opening in the vicinity of an end of the stack; a metal end structure held to said insulating casing; and metallic means adjustable in said end structure, holding the stack-sheets in intimate contact with one another successively; said metal end structure held to the insulating casing holding the latter under tension established by said adjustable member.

12. A high tension electrical condenser comprising a sheet-stack consisting of a plurality of serially-connected stack-sections; a tubular casing of insulating material extending around the sides of the stack; a metal end structure held to said casing and closing an end thereof, one end of the stack abutting against said metal end structure; and a stack-clamping structure engaging the other end of the stack, compressing the stack against said metal end member, and holding the stack-sheets in intimate contact with one another successively.

13. A high tension electrical condenser comprising a sheet-stack consisting of a plurality of serially-connected stack-sections, a casing of insulating material extending around the sides of said stack, and a stack-compressor located inside the casing and acting on the end of the stack to hold the stack sheets in intimate contact with one another successively, said stack-compressor being mechanically connected with the insulating casing, thereby putting said casing under stack-clamping tension.

14. A high tension electrical condenser comprising a sheet-stack consisting of a plurality of serially-connected stack-sections; a casing of insulating material extending around the sides of said stack; and means, of which said insulating casing is a part, for holding the stack-sheets in intimate contact with one another successively, said means comprising a stack-compressing member holding the insulating casing under tension.

15. A high tension electrical condenser comprising a sheet-stack consisting of a plurality of serially-connected stack-sections; a casing of insulating material extending around the sides of said stack; a metal end structure held to an end of said casing; and a member located between an end of the stack and said metal end structure, holding the insulating casing under tension and the stack under compression.

16. A high tension electrical condenser comprising a plurality of serially-connected stack-sections arranged in a stack having opposite potential ends; a casing enclosing said stack, the side-walls of the casing lying adjacent the sides of the stack and consisting of insulating material formed integrally in one piece; the ends of the casing including opposite potential condenser terminals held to the insulating casing-walls, electrically connected to the ends of the stack and insulated from one another by the side walls of the casing.

17. An electrostatic condenser comprising dielectric and conducting sheets; a casing of insulating material extending around the condenser and having an end opening in the vicinity of a portion thereof; a metal end structure located at said end of the insulating casing, secured thereto, and closing said casing opening; and an adjustable metal stack-clamping device mechanically connected with said metal end structure whereby the latter, by its mechanical connection with the insulating casing, puts said casing under tension when the adjustable clamping device is operated to compress the condenser.

18. An electrostatic condenser comprising a stack of dielectric and conducting sheets; an insulating casing extending around the sides of said stack and having end openings in the vicinity of the stack-ends; clamping means secured to one end of the insulating casing and thereby transmitting the tension strain of stack-clamping to the insulating wall of the casing; said clamping means being electrically connected to a part of the condenser; and a metal conducting path electrically connected with a part of the condenser of different potential and extending thru the other end opening of the insulating casing.

19. A high tension electrostatic condenser comprising a plurality of serially connected condenser-sections arranged directly adjacent one another in a single stack having a high potential difference across its ends; a casing of insulating material extending around the sides of said stack from end to end thereof and having opposite end openings adjacent the ends of said series-sectional stack; a metal end structure closing one end opening of said casing and mechanically supported thereby, said end structure being electrically connected with the adjacent end section of the stack and subjecting the stack to high mechanical compression; and a second terminal located at the other end of the stack and insulating casing, electrically connected with the section of the stack at that end thereof, and extending thru the opening in that end of the insulating casing, said casing electrically separating from one another said terminals of high potential difference.

20. An electrical condenser comprising sheets of dielectric and conductors and a casing therefor, the side walls of which are of insulating material and extend around the sides of said condenser; the ends of the casing being adjacent the ends of the condenser and including metal parts between which the condenser is compressed, and mechanically secured to the insulating side walls thereby transmitting tension strains of clamping thereto, said metal ends being electrically and thermally connected to opposite potential parts of the condenser, and formed with heat-dissipating projections at their portions outside the casing.

21. A clamped and enclosed construction for electrostatic condensers which comprises a casing for the condenser having an insulating portion and a metal portion, the insulating portion extending around the condenser and constituting a tension member of the condenser clamping system and the metal portion of the casing constituting a compression member of the clamping system, being mechanically connected with the insulating casing-portion to cause the latter to take the tension strains of the condenser compression.

22. A clamped and enclosed electrostatic condenser stack construction in which the tension member of the clamp compressing the ends of the stack consists of an insulating portion of the casing surrounding the sides of the stack between its compressed ends.

23. An electrostatic condenser construction which comprises an insulating casing having an end opening, a condenser having its sheets in planes parallel with said opening; a metal structure covering said opening and secured to the insulating casing; and a condenser compressor mounted in said metal structure and adjustable toward the flat end of the condenser; said metal casing-cover, by its connection with both the condenser compressor and the insulating casing, serving to include the latter as the tension member of the mechanical system by which the condenser is held under compression.

24. An electrostatic condenser structure which comprises a condenser including dielectric and armature sheets and electrical connections of opposite potential extending laterally of the condenser from its armatures; a casing of insulating material extending around the condenser laterally; a condenser-compressor located inside the insulating casing and holding the condenser sheets in intimate contact with one another successively; and means connected both with the insulating casing and the condenser-compressor and causing the insulating casing to be the tension member of the mechanical system by which the condenser is held under compression.

25. An electrostatic condenser structure which comprises a condenser including dielectric and armature sheets and electrical connections of opposite polarity extending from the armatures, and a casing in and by which the sheets of the condenser are clamped together and which completely encloses the condenser; said casing consisting of an insulating portion surrounding the lateral portion of the condenser and thereby preventing interference with one another of the opposite potential connections; said casing also consisting of two metal end structures secured to said insulating casing-portion, located in compressing relation with the condenser sheets, electrically connected, as opposite potential circuit terminals respectively, with said opposite potential electrical connections, and electrically separated from one another by said insulating casing-portion; the mechanical connections of said condenser-compressing metal portions with the insulating portion of the casing constituting said insulating portion as the tension member of the mechanical system holding the condenser under compression.

26. The combination with an electrostatic condenser stack, of two metal end structures respectively located at the two end faces of the stack; a tubular casing of insulating material extending around the sides of the stack, having end openings in the vicinity of the stack ends, and having its ends mechanically connected with the respective metal end structures; one of said metal end structures including an adjustable stack-compressing member which has a mechanical connection with the rest of the metal end structure which connection includes threaded metal pressure-applying means located at a compressing angle with said adjustable compressing member; the metal end structure which includes said adjustable compressing member including also threaded tension means of metal engaged by said threaded metal pressure applying means; all whereby the screwing up of the threaded metal pressure applying means causes the metal tension means to put the insulating casing under tension when the stack is compressed between the adjustable compressing member and the metal end structure located at the opposite end of the stack.

27. An enclosed high tension electrostatic condenser construction which comprises a condenser casing of insulating material having oppositely disposed openings; a condenser in the form of a stack of sheets and positioned in said insulating casing to have its sides extending along the insulating wall of the casing and its opposite ends in the vicinity of said casing-openings; said stack being divided by insulating separators into sections, and said sections being electrically connected in series with one another by armature-connections located outside the stack at the sides thereof and facing the wall of the casing, whereby there is a potential difference across the ends of each section and a high potential difference across the ends of the stack of sections; and two condenser terminals of opposite potential connected with the armatures of the two end sections of said stack and extending thru the opposite openings of the insulating casing; said casing extending from end to end of the stack and from one of said condenser terminals to the other, and preventing electrical interference of any of the stack-sections with one another or with any metal parts, and providing wide electrical separation entirely around the stack of the opposite stack ends and of said condenser terminals of high potential difference.

28. An enclosed high tension electrostatic condenser construction which comprises a condenser casing of insulating material having oppositely disposed openings; a condenser in the form of a stack of sheets and positioned in said insulating casing to have its sides extending along the insulating wall of the casing and its ends in the vicinity of said casing openings; said stack being divided by insulating separators into sections and said sections being electrically connected in series with one another by armature-connections located outside the stack at the sides thereof and facing the wall of the casing whereby there is a potential difference across the ends of each section; and two condenser terminals connected with the armatures of the two end sections of said stack and extending thru the opposite openings of said insulating casing; said insulating casing extending from end to end of the stack, from one of said condenser terminals to the other and entirely around the sides of the stack and preventing electrical interference of any of the stack sections with one another or with any metal parts.

29. A high potential condenser unit comprising a plurality of relatively low potential condensers arranged face to face with one another in a unit stack as closely adjacent together as desired for compactness, the oppositely poled armature terminals of the individual condensers projecting laterally from the unit stack, the armature-terminals of like polarity of adjacent individual condensers being connected together permitting the laterally projecting armature-terminals of unlike polarity of the same adjacent individual condensers, and lying at separated points along the length of the unit stack, to be subjected to relatively high potential differences; in combination with an encasing means for such unit stack which means includes a member of structural insulating material extending from end to end of the stack along the sides of all the individual condensers and surrounding said sides circumferentially and as closely adjacent as desired for compactness to said laterally projecting armature-terminals of relatively high potential difference; whereby all of the plurality of individual condensers are provided with a single common protective casing member of structural material which is non-conducting between all points of high potential difference between the ends and along the sides of the unit stack and adjacent said insulating member.

30. The improvement in electrical condensers which comprises, in combination with a condenser desired to be compressed and enclosed and to have its terminals insulated from one another, an enclosing casing which includes as principal member an element consisting of structural insulating material extending circumferentially around the condenser between its terminals, a portion of the enclosing casing being abutted by a portion of the enclosed condenser; and condenser clamping mechanism including at least two members having threaded engagement with one another, one being movable toward the enclosed condenser to compress the latter against the casing portion which it abuts, and the other being mechanically connected with the insulating member of the casing and subjecting its circumferential extent around the condenser to the stress resulting from the compression of the enclosed stack.

31. The improvement in electrical condensers which comprises, in combination with a condenser desired to be compressed and enclosed, and to have its terminals insulated from one another, an enclosing casing which includes as principal member an element consisting of structural insulating material extending circumferentially around the condenser between its terminals, a portion of the enclosing casing being abutted by a portion of the enclosed condenser; and condenser clamping mechanism including at least three members of which two are movable toward the condenser to compress the latter against the casing portion which it abuts and the other is mechanically connected with said two and with the insulating member of the casing subjecting the circumferential extent of the latter around the condenser to the stress resulting from the compression of the enclosed stack.

32. The improvement in electrical condensers which comprises, in combination with a condenser desired to be compressed and enclosed and to have its terminals insulated from one another, an enclosing casing which includes as principal member an element consisting of structural insulating material extending circumferentially around the condenser between its terminals, a portion of the enclosing casing being abutted by a portion of the enclosed condenser; and condenser clamping mechanism including at least two members of which one is movable toward the condenser to compress the latter against the casing-portion which it abuts and the other is mechanically connected with the first and with the insulating member of the casing subjecting the circumferential extent of the latter around the condenser to the stress resulting from the compression of the enclosed stack.

33. The improvement in electrical condensers which comprises, in combination with a condenser desired to be compressed and enclosed and to have its terminals insulated from one another, an enclosing casing which includes as principal member an element consisting of structural insulating material extending circumferentially around the condenser between its terminals, a portion of the enclosing casing being abutted by a portion of the enclosed condenser; and condenser clamping mechanism including at least three members of which the first engages the condenser opposite the portion of the condenser which abuts the enclosing casing, the second is secured to the insulating portion of the casing subjecting its circumferential extent around the condenser to the stress of the condenser compression by the first, and the third is threaded and thereby has mechanical connection with the second, said third member being movable on its threads to engage the first member to compress the condenser, said movement subjecting the insulating casing-member to said stress by way of the mechanical connection between the third and second members.

34. The improvement in electrical condensers which comprises, in combination with a condenser desired to be enclosed, to have its terminals insulated from one another and to have heat removed from its interior and dissipated outside the enclosure, an enclosing casing which includes as principal member an element consisting of structural insulating material extending circumferentially around the condenser between its terminals; a metal end structure completing the condenser enclosure at one end of said insulating member and having a substantial externally exposed heat-dissipating surface; and means conducting heat to such surface from the interior of the condenser, said means including a metal lead of substantial cross-sectional area located inside the casing and secured in good thermal connection with the armatures of the condenser and with said metal end structure.

GREENLEAF WHITTIER PICKARD.